(12) United States Patent
Soohoo

(10) Patent No.: US 9,433,160 B2
(45) Date of Patent: Sep. 6, 2016

(54) HYDROPONIC ARRAY FOR THE INDIVIDUALIZED DELIVERY OF NUTRIENTS

(71) Applicant: Disney Enterprises, Inc., Burbank, CA (US)

(72) Inventor: Elaine Soohoo, Elk Grove, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 490 days.

(21) Appl. No.: 13/848,679

(22) Filed: Mar. 21, 2013

(65) Prior Publication Data

US 2014/0283451 A1 Sep. 25, 2014

(51) Int. Cl.
*A01G 31/02* (2006.01)
*A01G 7/06* (2006.01)
*A01G 9/24* (2006.01)

(52) U.S. Cl.
CPC ............... *A01G 31/02* (2013.01); *A01G 7/06* (2013.01); *A01G 9/247* (2013.01)

(58) Field of Classification Search
CPC .............................. A01G 31/00; A01G 31/02
USPC ......... 47/62 R, 62 N, 66.6, 66.7, 1.7; 428/17
See application file for complete search history.

(56) References Cited

U.S. PATENT DOCUMENTS

| 4,149,970 | A | * | 4/1979 | Atkins et al. ................. 47/62 N |
| RE31,023 | E | * | 9/1982 | Hall, III ............................ 405/37 |
| 4,788,085 | A | * | 11/1988 | DeLuca .................... A41G 1/00 252/384 |
| 4,992,942 | A | * | 2/1991 | Bauerle et al. ............... 700/284 |
| 5,525,505 | A | * | 6/1996 | Young et al. ................. 435/430 |
| 5,624,838 | A | * | 4/1997 | Guri .............................. 435/410 |
| 5,798,150 | A | * | 8/1998 | Morford ................... A01N 3/00 156/57 |
| 5,807,604 | A | * | 9/1998 | Dokkestul et al. ................ 427/4 |
| 5,826,374 | A | | 10/1998 | Baca ................................ 47/62 |
| 5,862,628 | A | | 1/1999 | Takashima ..................... 47/65.8 |
| 6,243,987 | B1 | * | 6/2001 | Hessel ........................... 47/65.5 |
| 6,549,851 | B2 | | 4/2003 | Greensides ........................ 702/2 |
| 6,947,810 | B2 | * | 9/2005 | Skinner ......................... 700/283 |
| 7,832,144 | B2 | | 11/2010 | Corradi ......................... 47/62 R |
| 7,937,187 | B2 | | 5/2011 | Kaprielian .................... 700/284 |
| 8,033,049 | B2 | * | 10/2011 | St. Clair et al. ............... 47/65.9 |
| 2006/0150497 | A1 | | 7/2006 | Kaprielian .................... 47/62 R |
| 2006/0254138 | A1 | | 11/2006 | Bissonnette et al. ............. 47/60 |
| 2008/0120335 | A1 | | 5/2008 | Dolgoff ..................... 707/104.1 |
| 2008/0302002 | A1 | | 12/2008 | Schmidt ........................ 47/48.5 |
| 2010/0218423 | A1 | | 9/2010 | Walhovd ........................ 47/62 A |
| 2011/0244011 | A1 | | 10/2011 | Jongedijk et al. ............ 424/405 |

(Continued)

OTHER PUBLICATIONS

Gonzales, A.A. et al., "Engineering Strategies for the Design of Plant Nutrient Delivery Systems for Use in Space: Approaches to Countering Microbiological Contamination", http://www.sciencedirect.com/science/article/pii/027311779500857B, Adv. Space Res., vol. 18, No. 4/5, pp. (4/5)5-(4/5)20, 1996, 16 pages.

*Primary Examiner* — David Parsley
*Assistant Examiner* — Danielle Clerkley
(74) *Attorney, Agent, or Firm* — Sheppard Mullin Richter & Hampton LLP

(57) ABSTRACT

Systems and methods configured to deliver fluids to an array of plant deliver different fluids to different plants or groups of plants. The fluids include one or more of nutrients, dyes, insecticides, and/or herbicides. Delivery may be controlled such that a graphic and/or image is depicted by an array of plants or groups of plants.

18 Claims, 3 Drawing Sheets

(56) References Cited

U.S. PATENT DOCUMENTS

| | | | |
|---|---|---|---|
| 2012/0227322 A1 | 9/2012 | Belmote | 47/62 A |
| 2013/0333282 A1* | 12/2013 | Bisgrove et al. | 47/32.8 |
| 2014/0182203 A1* | 7/2014 | Church et al. | 47/62 N |
| 2014/0182204 A1* | 7/2014 | Church et al. | 47/62 N |

* cited by examiner

HYDROPONIC ARRAY FOR THE INDIVIDUALIZED DELIVERY OF NUTRIENTS

FIELD OF THE DISCLOSURE

This disclosure relates to the delivery of different nutrient fluids to plants.

BACKGROUND

Systems for delivery of nutrients and/or fluids to plants may be known. Hydroponic techniques, aeroponic techniques, geoponic techniques, and/or other techniques to grow plants in a controlled manner are known. The use of one or more dyes to affect a change of color in a plant is known. The arrangement of flowers to depict a graphic and/or an image may be known from flower-covered floats as used in some parades. The use of different nutrients and/or fluids to control plant growth is known. The use of different nutrients and/or fluids to control growth of organisms surrounding plants may be known.

SUMMARY

One aspect of the disclosure relates to a system configured to deliver fluids to plants. Plants may be arranged in plant sites. Individual plant sites may include and/or support one or more plants. The system may include two or more plant sites. Plants and/or plant sites may be arranged in an array, a regular pattern, an irregular pattern, a flat surface, a curved surface, a three-dimensional pattern, and/or other manners or combinations thereof. For example, plant sites may be arranged in a regular (two-dimensional or multi-dimensional) array including at least X by Y plant sites, wherein numbers X and Y may for example range anywhere from two to 10000. In some implementations, the array may range from ten thousand to a million plant sites in one or more directions.

Fluids may include one or more solutions, mixtures, dispersions, emulsions, suspensions, and/or combinations thereof that include one or more of (aerated) nutrients, dyes, insecticides, herbicides, chemical compounds, elemental components, active ingredients, and/or other substances that may be transported and/or delivered via a liquid (jointly referred to herein as "active ingredients"). Fluids may include combinations of materials. The system may use two or more fluids. Individual fluids may include active ingredients that are not included in other fluids. A supply of a fluid may be stored and/or held in a container. Individual ones of the containers may be configured to hold individual ones of the fluids.

The system may include conduits configured to communicate fluidly between containers and plant sites. In some implementations, individual conduits may be configured to communicate fluidly between individual containers and one or more plant sites. The conduits may form fluid paths between containers and plant sites. In some implementations, individual fluid paths may be formed between individual containers and individual plant sites. Conduits may be configured to transport fluids through the fluid path to plant sites.

In some implementations, a pump and/or regulator may be configured to be coupled fluidly to one or more conduits. For example, a pump may be configured to selectively pressurize one or more conduits. By virtue of being pressurized, one or more conduits may deliver one or more fluids to one or more plant sites through the fluid paths. Alternatively, and/or simultaneously, a regulator may be configured to selectively control delivery of fluids through one or more conduits, e.g. by controlling valves.

A controller may be configured to control delivery of fluids to the plant sites. The controller may be configured such that the amount of an individual fluid that is delivered is controlled. The controller may be configured such that the amounts of different fluids that are delivered are controlled separately. In some implementations, the controller may be configured to control delivery separately per one or more plant sites. It is understood that combinations of features and control described herein may be considered within the scope of this disclosure.

By virtue of the disclosure described herein, the system may be configured to control delivery of different fluids to different plant sites, the plants sites being arranged within a pattern, in such a manner that the plant sites depict one or more of a graphic, image, pattern, and/or other non-random configuration.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
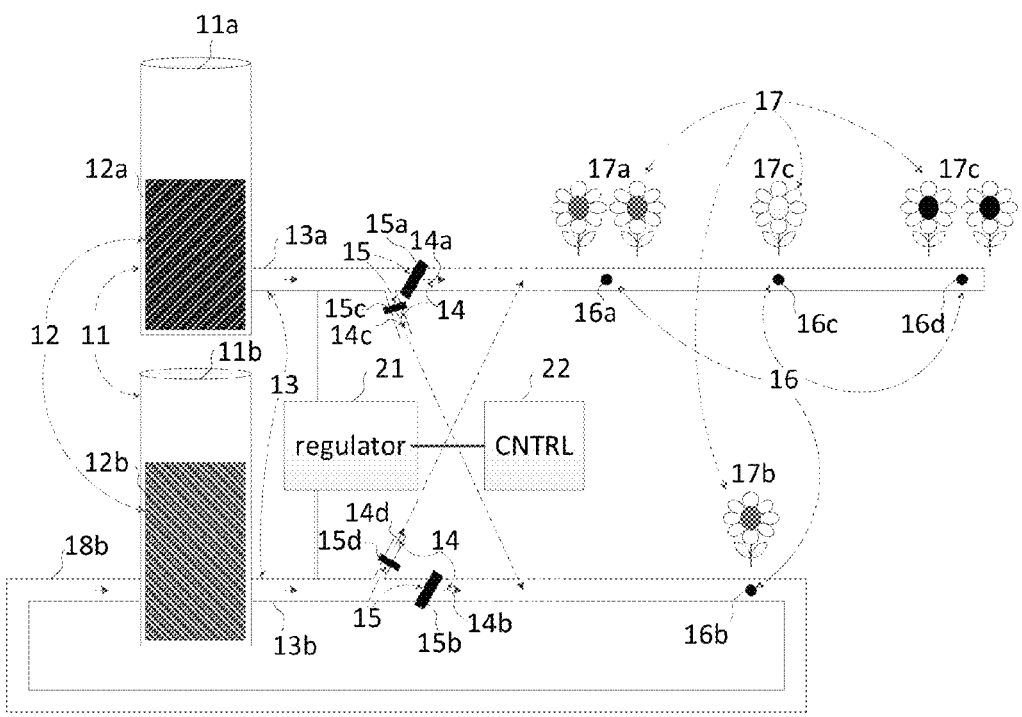
FIG. 1 illustrates a system configured to deliver fluids to plants, in accordance with one or more embodiments.

FIG. 1 illustrates a system 10 configured to deliver fluids to plants. In some embodiments, system 10 may include one or more containers 11, one or more fluids 12, one or more conduits 13, one or more fluid paths 14, one or more manifolds 15, one or more plant sites 17, one or more fluid delivery structures 16, one or more regulators 21, a controller 22, and/or other components. As depicted in FIG. 1, the one or more containers 11 may include a first container 11a and a second container 11b. The one or more fluids 12 may include a first fluid 12a and a second fluid 12b. The one or more conduits 13 may include a first conduit 13a and a second conduit 13b. The one or more fluid paths 14 may include a first fluid path 14a, a second fluid path 14b, a third fluid path 14c and a fourth fluid path 14d. The one or more manifolds 15 may include a first manifold 15a, a second manifold 15b, a third manifold 15c, and a fourth manifold 15d. The one or more plant sites 17 may include a first plant site 17a, a second plant site 17b, a third plant site 17c, and a fourth plant site 17d. The one or more fluid delivery structures 16 may include a first fluid delivery structure 16a, a second fluid delivery structure 16b, a third fluid delivery structure 16c, and a fourth fluid delivery structure 16d. The number of containers, fluids, conduits, fluid paths, manifolds, plant sites, and/or fluid delivery structures is not intended to be limited by the exemplary depictions in the figures. Rather, any plurality of these elements is contemplated within the scope of this disclosure.

Plants may be arranged in plant sites. Individual plant sites may include and/or support one or more plants. For example, as depicted in FIG. 1, first plant site 17a may include two plants, whereas second plant site 17b may include one plant. The number of plants per plant site is not intended to be limited by the examples in this disclosure. Individual plant sites may include a pot, a box, a bag, a basket, a mesh, and/or another structure to contain physically one or more included plant in one or more directions. In some implementations, such structure may include soil, fertilizer, water, a growing substrate, and/or other components useful to support and/or grow plants. In some implementations, the substrate and/or other components may be shared among more than one plant site. In some implementations, individual plant sites may be arranged such that the delivery of a fluid through a fluid delivery structure is intended to affect and/or impact plant sites individually. In other words, a plant site may be delineated by which plants are affected (or intended to be affected) by delivery of a particular individual fluid. In some implementations, a plant site may be delineated by the area that is affected (or intended to be affected) by a particular individual fluid delivery structure. In some implementations, a particular plant site may be delineated by the selectively and individually controlled delivery of one or more fluids to that particular plant site. System 10 may include two or more plant sites. For example, as depicted in FIG. 1, system 10 may include four plant sites. The plants in different plant sites may be different. In some implementations, similar plants may be used in different plant sites.

Figure 2:
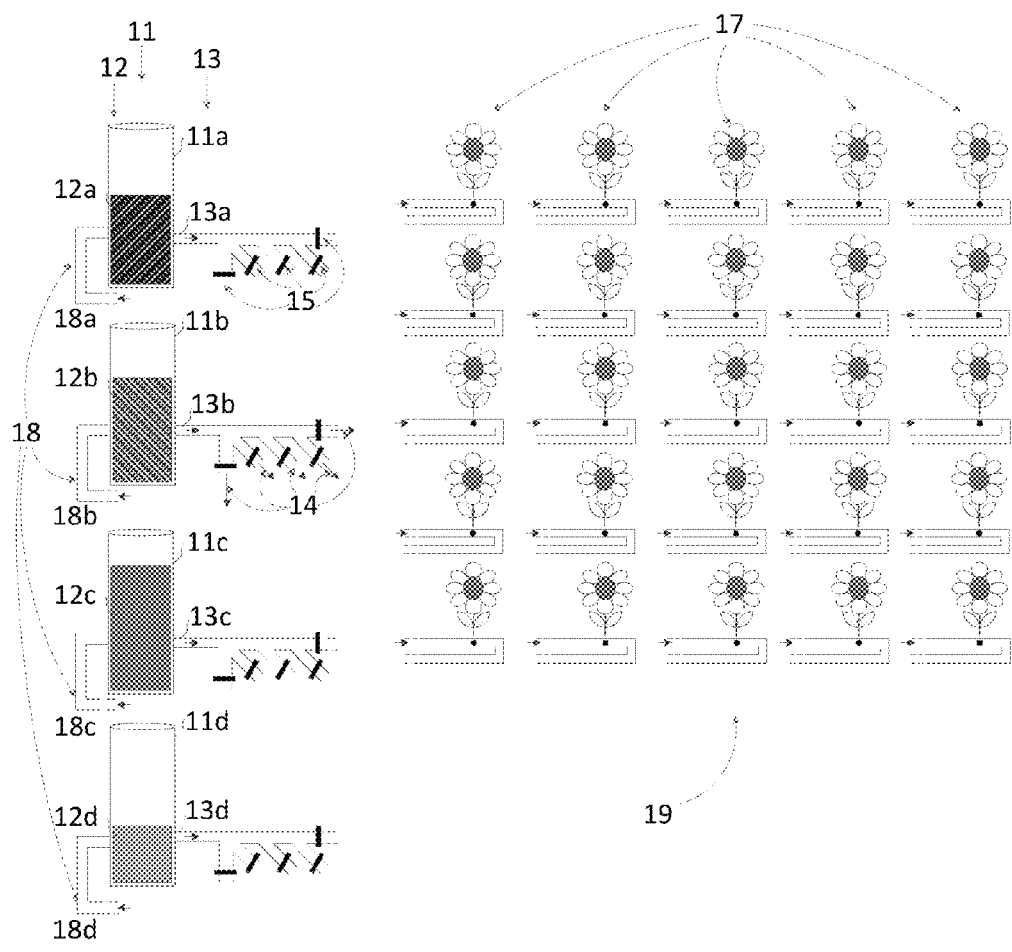
FIG. 2 illustrates a system configured to deliver fluids to plants, in accordance with one or more embodiments.

Plants and/or plant sites may be arranged in an array, a regular pattern, an irregular pattern, a flat surface, a curved surface, a three-dimensional pattern, and/or other manners or combinations thereof. As used herein, the term array may refer to both uniformly distributed arrays and non-uniformly distributed arrays. For example, plant sites may be arranged in a regular two-dimensional or multi-dimensional array including at least X by Y plant sites, wherein numbers X and Y may for example range anywhere from two to 10000. By way of illustration, FIG. 2 illustrates a system 10b that includes similar features as system 10 of FIG. 1. In FIG. 2, system 10b depicts plant sites 17 arranged in a regular array 19 of five by five plant sites.

Returning to FIG. 1, fluids may include one or more of nutrients (or nutrient media), dyes, insecticides, herbicides, chemical compounds, elemental components, active ingredients, and/or other substances that may be transported and/or delivered to a plant via a liquid. For example, the liquid may include water, and/or other liquids. Fluids may include combinations of materials and/or active ingredients. System 10 may use two or more fluids. For example, as depicted in FIG. 1, system 10 may include first fluid 12a and second fluid 12b. Individual fluids may include active ingredients that are not includes in other fluids. For example, first fluid 12a may include one or more elemental components (e.g. sulpher, elemental iron, etc.) that are not included in second fluid 12b. Conversely, second fluid 12b may include one or more active ingredients that are not included in first fluid 12a. In other words, individual fluids may include one or more active ingredients that are exclusive to the individual fluid. In some implementations, systems may include a plurality of N fluids, all or some of which include one or more exclusive active ingredients. For example, first fluid 12a may include a dye of a first color, and second fluid 12b may include a dye of a second color that is different from the first color. In some implementations, individual fluids may include different concentrations of one or more active ingredients, such that the specific concentration of at least one active ingredient is specific to and/or distinguishable for an individual fluid.

A supply of a fluid may be stored and/or held in a container. Individual ones of the containers may be configured to hold individual ones of the fluids. For example, as depicted in FIG. 1, first fluid 12a may be held in first container 11a. For example, second fluid 12b may be held in second container 11b. In some implementations, systems may include a plurality of N fluids that are held in at least N separate containers. In some implementations, multiple containers may include the same fluid.

One or more conduits 13 may be configured to communicate fluidly between one or more containers 11 and one or more plant sites 17. In some implementations, individual conduits may be configured to communicate fluidly between individual containers and one or more plant sites. As depicted in FIG. 1, an individual fluid path such as first fluid path 14a for example, may be configured to communicate fluidly with multiple plant sites such as first plant site 17a, third plant site 17c and fourth plant site 17d. Conduits with dotted lines (e.g. first conduit 13a) may be considered to extend as described in this disclosure. As depicted in FIG. 1, first conduit 13a may be configured to communicate fluidly between first container 11a and first plant site 17a. Second conduit 13b may be configured to communicate fluidly between second container 11b and second plant site 17b. One or more conduits 13 may form one or more fluid paths 14 between container(s) 11 and plant site(s) 17. In some implementations, individual fluid paths may be formed between individual containers and individual plant sites.

One or more conduits 13 may be configured to transport one or more fluids 12 through one or more fluid paths 14 to one or more plant sites 17. For example, as depicted in FIG. 1, first fluid path 14a may be formed between first container 11a and first plant site 17a. Second fluid path 14b may be formed between second container 11b and second plant site 17b. Third fluid path 14c may be formed between first container 11a and second plant site 17b (as indicated by the dotted arrow in FIG. 1). Fourth fluid path 14d may be formed between second container 11b and second plant site 17b (as indicated by the dotted arrow in FIG. 1). By virtue of fluid paths 14 being formed, fluids from multiple containers 11 may be delivered to multiple plant sites 17. In some implementations, all permutations of delivery from individual containers 11 to individual plant sites 17 may be supported by individual fluid paths 14. In some implementations, a subset of all such permutations may be supported.

In some implementations, conduits may be configured to communicate fluidly in one direction. For example, using aeroponic growing techniques, a fluid delivered to a plant site may be sprayed, e.g. as a mist. In such cases, no fluid may need to be returned to a reservoir, supply, and/or container. In some implementations, conduits may be configured to communicate fluidly from a container as well as to a container. In other words, such conduits may communicate in more than one direction. For example, in some implementations, one or more conduits may be arranged in a loop from a container to one or more plant sites, and subsequently to one or more containers. In a straightforward loop, fluid communication may return to the same container as depicted in FIG. 1. Such a loop may include components that are not shown in FIG. 1, such as, by way of non-limiting example, a filter. As depicted in FIG. 1, a conduit 18b may be configured to return fluid from second plant site 17b back to second container 11b.

Fluid delivery structure 16 may be configured to deliver fluid to plant sites 17. For example, first fluid delivery structure may be configured to deliver first fluid 12a from first fluid path 14a and/or first conduit 13a to first plant site 17a. In some implementations, a fluid delivery structure may include one or more apertures, drips, and/or holes in a conduit or a set of conduits. For example, in drip irrigation a fluid may be delivered through a small hole in a conduit. In some implementations, a fluid delivery structure may include a spray nozzle and/or misting mechanism. For example, using aeroponic growing techniques, first fluid delivery structure 16a may include a spray nozzle to deliver first fluid 12a to first plant site 17a. The type, range, and/or dimensions of a fluid delivery structure may depend on the type of growing technique used, the type of fluid used, the type of nutrients, dyes, and other substances and/or active ingredients intended to be delivered, and/or other factors. For example, the size of drip openings used in drip irrigation may vary.

In some implementations, system 10 may include one or more manifolds 15. Individual manifolds may be configured to selectively control and/or affect the flow rate in one or more conduits and/or one or more fluid paths. For example, as depicted in FIG. 1, first manifold 15a may be configured to control selectively the flow rate of first fluid 11a within first fluid path 14a. Second manifold 15b may be configured to control selectively the flow rate of second fluid 11a within second fluid path 14b. Third manifold 15c may be configured to control selectively the flow rate of first fluid 11a within third fluid path 14c. Fourth manifold 15d may be configured to control selectively the flow rate of second fluid 11b within fourth fluid path 14b. One or more manifolds 15 may be controlled by controller 22.

In some implementations, regulator 21 may be configured to be coupled fluidly to one or more conduits 13. The term regulator is intended to include devices that control fluid delivery, e.g. through one or more valves, and/or pumps. For example, regulator 21 may operate through a gravity feed. The term "pump" is intended to include any source of pressurization and/or force for the purpose of transporting fluid within conduits 13. For example, this may include one or more of an air pump, a water pump, and/or other pumps or combinations thereof. One or more air pumps may be used to aerate one or more fluids. The number of regulators is not intended to be limited by this disclosure. In some implementations, system 10 may include multiple regulators. Regulator 21 may be configured to selectively pressurize (or otherwise apply force to) one or more conduits 13. By virtue of being pressurized, one or more conduits 13 may deliver one or more fluids 12 to one or more plant sites 17 through the fluid paths 14. The location and/or position of regulator 21 is not intended to be limited in any way by any of the figures. In some implementations, regulator 21 may be located and/or positioned between the one or more containers 11 and the one or more plant sites 17. In some implementations, regulator 21 may be located and/or positioned at or near the end of the one or more conduits 13, and/or after the one or more plant sites.

Controller 22 may be configured to control delivery of one or more fluids 12 to one or more plant sites 17. Controller 22 may be configured to control regulator 21 to control delivery of fluids. Controller 22 may include a timer. Controller 22 may be configured such that the amount of an individual fluid that is delivered is controlled. In some implementations, controller 22 may be programmable. Controller 22 may be configured such that the amounts of different fluids that are delivered are controlled separately. For example, delivery may be controlled per plant site and/or per fluid. In some implementations, controller 22 may be configured to control delivery separately per one or more plant sites. It is understood that combinations of features and control described herein may be considered within the scope of this disclosure.

By virtue of the disclosure described herein, system 10 may be configured to control delivery of different fluids 12 to different plant sites 17, the plants sites being arranged within a pattern, in such a manner that the plant sites depict one or more of a graphic, image, pattern, and/or other non-random configuration. By way of illustration, plant sites 17 in FIG. 2 may be arranged in (regular) array 19. Individual plant sites 17 may be considered conceptually as individual pixels of a graphic, image, and/or pattern. The numerical size of array 19 may correspond to the refluid of the graphic, image, and/or pattern that may be created by virtue of the disclosure herein. Fluids may be delivered selectively and/or individually to plants per individual plant site 17. For example, by individual and separate delivery of fluids including different dyes, plants per individual plant site 17 may obtain different colors.

FIG. 2 illustrates system 10b. System 10b may include four containers 11, holding four fluids 12. Each of the four containers 11 may communicate fluidly through respective conduits (conduits 13a-13d), each of which forms one or more fluid paths (not individually labeled in FIG. 2) such that fluid may be delivered selectively and separately to one or more plant sites 17, if not all plant sites 17 in array 19. Note that the extent of the conduits in FIG. 2 may not be limited to points at or near any of the manifolds depicted in FIG. 2. Instead, the conduits, fluid paths, and manifolds may be arranged such that individual plant sites 17 in the array may fluidly be connected individually and selectively to any one or more containers 11.

System 10b may include return conduits 18 (return conduits 18a-18d) such that the respective fluids may be returned to the appropriate containers, e.g. the containers that hold the respective fluids. System 10b may include individual manifolds (not individually labeled in FIG. 2) per fluid path and/or per plant site 17 in array 19. Note that some components in system 10b are not shown in FIG. 2, including a regulator and a controller. Note that some components in system 10b may not be individually labeled in FIG. 2, including for example the fluid paths and manifolds that are fluidly connected to a third container 11c (configured to hold a third fluid 12c) and a fourth container 11d (configured to hold a fourth fluid 12d). System 10b may include individual conduits, fluid paths, and manifolds to deliver any of the fluids 12 to any of the plant sites 17.

In some implementations, the four fluids 12 depicted in FIG. 2 each include a different dye. The plant sites 17 in system 10b may thus obtain different colors to depict a graphic, image, and/or pattern in at least four different colors. In some implementations, the system includes more than four containers. In some implementations, the system includes more than four different fluids and/or more than four different colors.

In some implementations, fluids including different dyes may be delivered after being mixed within one or more conduits and/or fluid paths. In such a way, using N different dyes in N fluids may lead to plants having more than N different colors. For example, by combining and/or mixing red, green, and blue appropriately in a manner similar to the combination of red, green, and blue in pixels used for displays, plant sites 17 may obtain a wide variety of colors. Alternatively, the system may include containers 11 arranged and/or organized in a numerically similar array as array 19. Different dyes may be distributed over such an array of containers to depict a graphic, image, and/or pattern. In due time, the depiction by array 19 of plant sites 17 may correspond to the depiction by such an array of containers. Implementations using any number of containers, fluids, and dyes in the range between two and the total number of plant sites 17 may be considered within the scope of this disclosure.

Problems with one or more particular plants or plant sites may occur. An example of a problem may be that a particular plant site may trail in growth compared to other plant sites in an array. An example of a problem may be that a particular plant site flowers or fruits to early or too late compared to other plant sites in an array. An example of a problem may be that a particular plant site suffers an infestation and/or a fungal growth. Through finely tuned delivery of additional nutrients, substances, and/or active ingredients (for example insecticides and/or herbicides) to the particular plant involved such a problem may be alleviated, reduced, and/or resolved. In some implementations, a problem may be addressed by adjusting the delivery of nutrients to one or more surrounding plant sites. For example, an infestation may be addressed by delivering sugar water to nearby plant sites to attract a natural predator for a particular infestation, such as, by way of non-limiting example, an infestation of butterflies or ladybugs. In some instances, a problem may be due to the availability and/or amount of sunlight received by one or more plant sites. In some implementations, one or more plant sites in an array may have structural problems that need to be addressed in a manner described herein.

In some implementations, systems similar to system 10 in FIG. 1 or system 10b in FIG. 2 may include one or more sensors. One or more sensors may be configured to generate output signals conveying information. In some implementations, the conveyed information may be related to environmental conditions, plant-specific conditions, and/or plant-site-specific conditions. In some implementations, the conveyed information may be related to one or more fluids. For example, the conveyed information may be related to characteristics of a specific fluid at or near a particular location within an array of plant sites. In some implementations, conveyed information may be specific to individual plant sites. Delivery of one or more fluids may be controlled based on output signals generated by one or more sensors. In some implementations, a sensor may include a camera configured to capture image information. Through analysis of the image information, and based on known properties of an array of plant sites, delivery of one or more fluids may be adjusted based on the captured image information. In some implementations, the one or more sensors may include thermometers, pH meters, water level indicators, humidity sensors, light/radiation meters, sensors related to measurements for specific nutrients or chemicals, and/or other sensors.

Environmental conditions, plant-specific conditions, and/or plant-site-specific conditions may include one or more of ambient temperature, ambient humidity, ambient and/or local level of exposure to (sun)light, pH level, soil conditions, fungal activity, a level of infestation, color information of a plant (site), and/or other conditions. Fungal activity may refer to a presence of a particular type of fungi and/or a quantification of the presence of a particular type of fungi, in particular if the quantification breaches a predetermined threshold that indicates a problem that should be addressed. Similarly, a level of infestation may refer to a presence of a particular insect and/or organism and/or a quantification of such a presence.

Information related to one or more fluids may include one or more of a concentration or level of a particular substance in a fluid, a chemical composition, flow rate, electrical conductivity, and/or other fluid-specific information. The particular substance may include a nutrient, a dye, insecticide, herbicide, and/or other substances and/or active ingredients.

In some implementations, a controller similar to controller 22 of FIG. 1 may be configured to adjust and/or control delivery of fluids based on output signals generated by one or more sensors. For example, such a controller may use one or more output signals in a feedback manner, a feed-forward manner, and/or in another manner. In some implementations, a controller may be programmed with target conditions, such as a target color, that is intended for one or more particular plant sites. For example, a controller may adjust the color level of the one or more particular plant sites in responsive to output signals being generated that convey color information for the one or more particular plant sites. For example, the conveyed color information may indicate that the current color does not match a target color.

Figure 3:
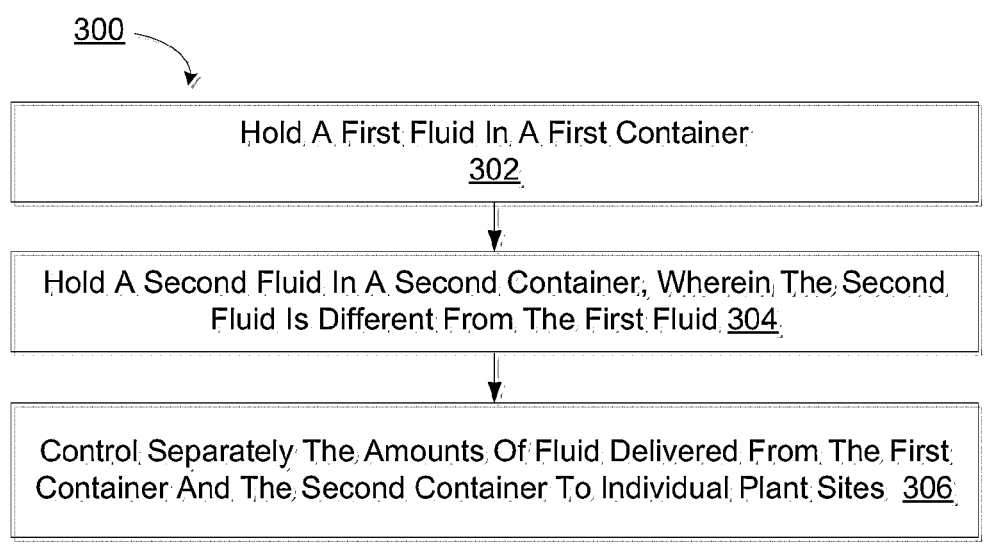
FIG. 3 illustrates a method for delivering fluids to plants, in accordance with one or more embodiments.

FIG. 3 illustrates a method 300 for delivering active ingredients to plant sites, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a first fluid is held in a first container. In some embodiments, operation 302 is performed by a container the same as or similar to first container 11a (shown in FIG. 1 and described herein).

At an operation 304, a second fluid is held in a second container. The second fluid is different from the first fluid. The first fluid includes one or more active ingredients that are not included in the second fluid. The second fluid includes one or more active ingredients that are not included in the first fluid. In some embodiments, operation 304 is performed by a container the same as or similar to second container 11b (shown in FIG. 1 and described herein).

At an operation 306, the amounts of fluids delivered from the first container and the second container are controlled separately to individual plant sites. In some embodiments, operation 306 is performed by a regulator and/or a controller the same as or similar to regulator 21 and/or controller 22 (shown in FIG. 1 and described herein).

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to deliver fluids to an array of plant sites, wherein the array of plant sites includes a first plant site holding a first plant and a second plant site holding a second plant, the system comprising:
    a set of containers configured to hold fluids, wherein the set of containers includes a first container and a second container, the first container holding a first fluid, the second container holding a second fluid that is different from the first fluid, wherein the first fluid includes one or more active ingredients that are not included in the second fluid, and wherein the second fluid includes one or more active ingredients that are not included in the first fluid;
    a set of conduits forming fluid paths between the containers and the plant sites, the fluid paths including fluid paths between the first container and the first plant site, between the first container and the second plant site, between the second container and the first plant site, and between the second container and the second plant site, wherein the conduits are configured to transport fluids from the set of containers through the fluid paths to the array of plant sites;
    a regulator configured to be controllably deliver the fluids to specific ones of the plant sites from the containers through the fluid paths; and
    a controller configured to:
        control the regulator such that the amounts of each of the first fluid and the second fluid that are delivered to the first plant site are controlled separately from each other and separately from the amounts of the first fluid and the second fluid that are delivered to the second plant site,
        the first fluid including a first dye such that the first plant is colored by the first dye during growth, and the second fluid including a second dye of a different color than the first dye such that the second plant is colored by the second dye during growth;
        obtain image information defining an image captured by a camera; and
        adjust the control of the regulator based on the image information, such that the amounts of each of the first fluid and the second fluid that are delivered to the first plant site are adjusted based on the image information, and the amounts of the first fluid and the second fluid that are delivered to the second plant site are adjusted based on the image information, and the adjustment of the control of the regulator being such that a graphic is depicted by the array of plant sites based on the delivery of the first fluid and the second fluid, the graphic corresponding to the image information.

2. The system of claim 1, wherein one or more individual fluids include one or more nutrients and/or nutrient media.

3. The system of claim 1, wherein one or more individual fluids include one or more dyes.

4. The system of claim 1, wherein the array of plant sites is arranged to form a multi-dimensional array.

5. The system of claim 1, wherein one or more individual fluids include an active ingredient that affects fluorescence of plants.

6. The system of claim 1, wherein individual fluids include one or more insecticides and/or one or more herbicides.

7. The system of claim 1, further comprising one or more sensors configured to generate output signals conveying information related to environmental conditions, wherein operation of the controller is based on the generated output signals.

8. The system of claim 7, wherein individual sensors are configured to generate output signals conveying information specific to individual plant sites.

9. The system of claim 8, wherein the environmental conditions specific to individual plant sites include color information.

10. The system of claim 8, wherein the environmental conditions specific to individual plant sites include one or both of a level of fungal activity and/or a level of infestation.

11. The system of claim 7, wherein the environmental conditions include one or more of temperature, humidity, level of exposure to light, pH level, and/or soil conditions.

12. The system of claim 1, further comprising one or more manifolds configured to affect one or more fluid paths, wherein operation of the controller includes controlling the one or more manifolds.

13. The system of claim 1, wherein the set of containers includes a third container and a fourth container,
    the third container holding a third fluid that is different from the first fluid and the second fluid,
    the fourth container holding a fourth fluid that is different from the first fluid, the second fluid, and the third fluid,
    wherein the third fluid includes one or more active ingredients that are not included in either the first fluid or the second fluid,
    wherein the fourth fluid includes one or more active ingredients that are not included in either the first fluid, the second fluid, or the third fluid,
    wherein the array of plant sites includes a third plant site and a fourth plant site, wherein the set of conduits forms one or more fluid paths between the third container and one or both of the third plant site and/or the fourth plant site, wherein the set of conduits forms one or more fluid paths between the fourth container and one or both of the third plant site and/or the forth plant site, and wherein the controller is furthermore configured such that delivery of one or more fluids to one or both of the third plant site and/or the fourth plant site is controlled.

14. The system of claim 1, wherein the image information defines individual pixels of the image, and wherein the controller is further configured to:
    control the regulator such that the amount of each of the first fluid and second fluid delivered to the first plant site is configured to dye one or more plants at the first plant site to reproduce a first pixel of the image, and the amount of each of the first fluid and second fluid delivered to the second plant site is configured to dye one or more plants at the second plant site to reproduce a second pixel of the image.

15. A method for delivering fluids to an array of plant sites, wherein the array of plant sites includes a first plant site holding a first plant and a second plant site holding a second plant, the method comprising:

holding a first fluid in a first container;

holding a second fluid in a second container, wherein the second fluid is different from the first fluid, wherein the first fluid includes one or more active ingredients that are not included in the second fluid, and wherein the second fluid includes one or more active ingredients that are not included in the first fluid;

selectively controlling delivery of the first fluid and the second fluid to one or both of the first plant site and/or the second plant site such that the amounts of each of the first fluid and the second fluid that are delivered are controlled separately from each other and specific per individual plant site;

controlling delivery of the first fluid and the second fluid to individual ones of the plant sites in the array such that the amounts of each of the first fluid and the second fluid that are delivered to the first plant site are controlled separately from each other and separately from the amounts of the first fluid and the second fluid that are delivered to the second plant site; and wherein the first fluid includes a first dye such that the first plant is colored by the first dye during growth, wherein the second fluid includes a second dye of a different color than the first dye such that the second plant is colored by the second dye during growth, and wherein delivery of the first fluid and the second fluid is controlled such that a graphic is depicted by the array of plant sites.

16. The method of claim 15, wherein one or more individual fluids includes one or more of nutrient media, insecticide, and/or herbicide.

17. The method of claim 15, further comprising:

generating output signals conveying information related to environmental conditions per plant site, wherein environmental conditions include one or more of temperature, humidity, level of exposure to light, pH level, soil conditions, fungal activity, and/or a level of infestation, wherein controlling delivery is based on the generated output signals.

18. The method of claim 15, further comprising:

generating output signals conveying information related to the first fluid, wherein the information includes one or more of electrical conductivity, a pH level, fluid temperature, and/or composition of the first fluid, wherein controlling delivery is based on the generated output signals.

* * * * *